United States Patent
Kumar et al.

(10) Patent No.: US 12,018,166 B2
(45) Date of Patent: Jun. 25, 2024

(54) THERMOPLASTIC VULCANIZATES MODIFIED POLYPROPYLENE FOR SUBSEA INSULATION

(71) Applicant: Dow Global Technologies LLC, Midland, MI (US)

(72) Inventors: Bhawesh Kumar, Lake Jackson, TX (US); Rujul M. Mehta, Manvel, TX (US)

(73) Assignee: Dow Global Technologies LLC, Midland, MI (US)

(*) Notice: Subject to any disclaimer, the term of this patent is extended or adjusted under 35 U.S.C. 154(b) by 762 days.

(21) Appl. No.: 17/253,009

(22) PCT Filed: May 29, 2019

(86) PCT No.: PCT/US2019/034333
§ 371 (c)(1),
(2) Date: Dec. 16, 2020

(87) PCT Pub. No.: WO2020/005442
PCT Pub. Date: Jan. 2, 2020

(65) Prior Publication Data
US 2021/0277271 A1 Sep. 9, 2021

Related U.S. Application Data

(60) Provisional application No. 62/692,164, filed on Jun. 29, 2018.

(51) Int. Cl.
*C09D 123/16* (2006.01)
*C08L 23/12* (2006.01)
(Continued)

(52) U.S. Cl.
CPC ............ *C09D 123/16* (2013.01); *C08L 23/12* (2013.01); *C08L 23/16* (2013.01); *C09D 7/63* (2018.01); *C09D 123/12* (2013.01); *F16L 59/028* (2013.01)

(58) Field of Classification Search
CPC .......... C08L 23/12; C08L 23/10; C08L 23/16; C08L 2207/02; C08L 2205/02; C09D 123/12; C09D 123/10; C09D 123/16
See application file for complete search history.

(56) References Cited

U.S. PATENT DOCUMENTS 4,132,698 A * 1/1979 Gessler .................. C08K 5/098
524/518
4,319,005 A * 3/1982 Spielau .................. C08L 23/12
525/88

(Continued)

FOREIGN PATENT DOCUMENTS

EP 0472268 A2 2/1992
WO 2007096209 A1 8/2007

OTHER PUBLICATIONS

Office Action from corresponding Chinese Application: 201980045693.7 dated Jan. 29, 2023.
(Continued)

*Primary Examiner* — Rip A Lee
(74) *Attorney, Agent, or Firm* — Arthur R. Rogers

(57) ABSTRACT

A polypropylene/thermoplastic vulcanizate insulative coating is disclosed. The coating is particularly suited for subsea applications, in particular providing insulation to joints in oil well pipes and other machinery. The coating exhibits mechanical properties superior to joint insulation coatings known in the art, especially in combination with other insulation coatings.

15 Claims, 4 Drawing Sheets

(51) Int. Cl.
*C08L 23/16* (2006.01)
*C09D 7/63* (2018.01)
*C09D 123/12* (2006.01)
*F16L 59/02* (2006.01)

(56) References Cited

U.S. PATENT DOCUMENTS

| | | | | |
|---|---|---|---|---|
| 4,407,998 | A * | 10/1983 | Duvdevani | C08L 23/12 524/400 |
| 4,666,989 | A * | 5/1987 | McCullouch, Jr. | C08L 23/12 525/240 |
| 4,769,283 | A * | 9/1988 | Sipinen | C08L 23/16 604/389 |
| 5,247,007 | A * | 9/1993 | Nitta | C08L 53/00 427/407.1 |
| 5,409,992 | A * | 4/1995 | Eppert, Jr. | C08L 53/00 525/88 |
| 5,508,318 | A * | 4/1996 | Comer | C08L 23/10 522/158 |
| 6,100,334 | A * | 8/2000 | Abdou-Sabet | C08L 23/16 525/240 |
| 6,245,856 | B1 * | 6/2001 | Kaufman | C08L 23/12 525/88 |
| 6,843,950 | B1 * | 1/2005 | Mally | F16L 58/181 264/327 |
| 7,217,766 | B2 * | 5/2007 | Datta | C08L 23/142 525/240 |
| 7,517,935 | B2 * | 4/2009 | Lee | C08L 53/00 525/197 |
| 7,696,276 | B2 * | 4/2010 | Ellul | C08L 23/12 525/240 |
| 8,343,602 | B2 * | 1/2013 | Rigosi | C08L 23/10 428/35.8 |
| 8,415,447 | B2 | 4/2013 | Rydin et al. | |
| 9,309,396 | B2 * | 4/2016 | Sun | C08L 23/16 |
| 10,047,201 | B2 * | 8/2018 | Hirose | C08J 3/24 |
| 2007/0299160 | A1 | 12/2007 | Delanaye et al. | |

OTHER PUBLICATIONS

PCT/US2019/034333, International Search Report and Written Opinion with a mailing date of Aug. 7, 2019.
PCT/US2019/034333, International Preliminary Report on Patentability with a mailing date of Dec. 29, 2020.

* cited by examiner

THERMOPLASTIC VULCANIZATES MODIFIED POLYPROPYLENE FOR SUBSEA INSULATION

CROSS-REFERENCE

This International Patent application claims priority to U.S. Provisional Patent Application No. 62/692,164, filed Jun. 29, 2018.

FIELD OF THE INVENTION

This invention relates to thermal insulation for pipes and other materials that convey fluids. Specifically, this invention relates to a thermal insulation material that can be applied to the exposed end of an otherwise insulated pipe that will complement the mechanical properties of the preexisting insulation.

BACKGROUND OF THE INVENTION

Deep-sea oil production and transportation machinery, such as subsea flowlines and oil well "Christmas trees," require thermal insulation coatings to ensure that the hot crude oil contained within the machinery flows properly. One of the most common forms of deep-sea machinery insulation is 5-layer polypropylene (5LPP) insulation. As the name implies, 5LPP insulation is a multi-layer polypropylene insulation comprising layers which provide an adhesive function, as well as hollow glass spheres that provide an insulating function, and unmodified polypropylene that provides a water barrier, mechanical integrity, and impact resistance. 5LPP is typically applied on steel pipes having lengths between 33' to 82' and diameters between 6" to 16". Such pipes are typically welded together in the field via the "field joint" method. To prepare a field joint, the insulation at the end of pipes is removed and the exposed pipe is cleaned, welded, further cleaned, and treated with an anti-corrosion coating. Finally, an insulation coating of incumbent polypropylene is injection-molded onto the exposed pipe. Such a method is disclosed in WO2007096209.

Incumbent polypropylene is a different material from the polypropylenes utilized in 5LPP insulation, and as such has different mechanical and physical properties. Often, the combination of incumbent polypropylene and 5LPP leads to failure (in the form of cracking) at the time of deployment of the pipeline in offshore subsea applications. Since any repairs must be completed offshore in difficult circumstances, such failures are costly, time-consuming, and potentially dangerous. U.S. Pat. No. 8,415,447 attempts to solve the issue of cracking by disclosing the use of polyolefin coated steel pipes. However, the polyolefins lack the layer structure of 5LPP, and as such the mechanical properties of the materials are inferior.

What is needed is an insulating coating that not only replaces incumbent polypropylene but is also more closely matched in its mechanical properties with respect to 5LPP, and/or has lower shrinkage resulting in lower residual stress after injection molding.

SUMMARY OF THE INVENTION

The disclosed invention covers applying an insulating coating containing polypropylene and thermoplastic vulcanizates to an exposed end of pipe that is otherwise coated with a separate insulating material.

The disclosed invention modifies incumbent polypropylene (PP) with thermoplastic vulcanizates (TPVs) which behave as an elastomer. In one preferred embodiment, 35 wt. % TPV is added to incumbent polypropylene. It has been determined that the addition of TPV results in lower shrinkage in polypropylene which essentially reduces the residual stress by approximately 50% as compared to the incumbent material.

DETAILED DESCRIPTION OF THE PREFERRED EMBODIMENTS

Figure 1:
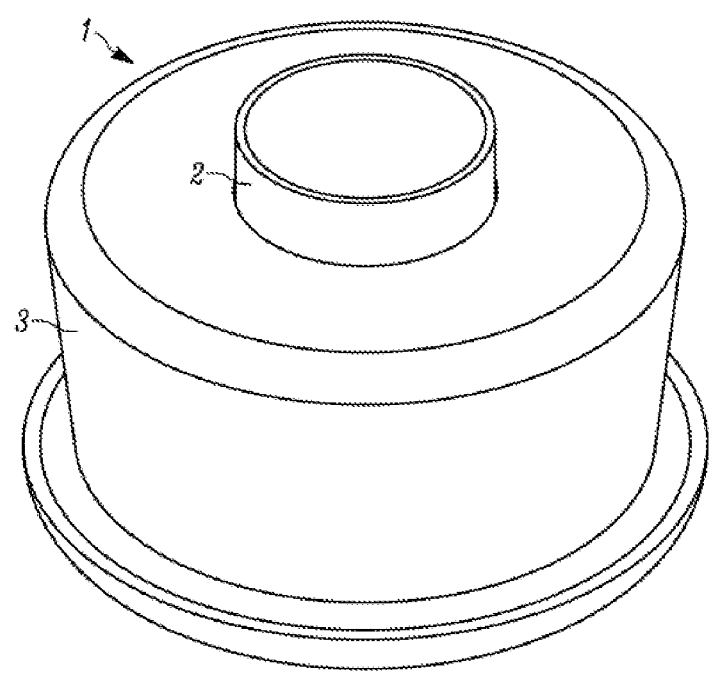
FIG. 1 is a drawing depicting a pipe coated with the disclosed insulating PP/TPV coating.

The disclosed invention covers applying an insulating coating containing polypropylene and thermoplastic vulcanizates to an exposed end of pipe that is otherwise coated with a separate insulating material.

All percentages stated herein are weight percentages (wt. %), unless otherwise indicated.

Temperatures are in degrees Celsius (° C.), and "ambient temperature" means between 20° C. and 25° C., unless specified otherwise.

"Polymer" generally refers to a polymeric compound or "resin" prepared by polymerizing monomers, whether of the same or different types. As used herein, the generic term "polymer" includes polymeric compounds made from one or more types of monomers.

Polypropylene

Polypropylene (PP) is a thermoplastic polymer having the chemical formula:

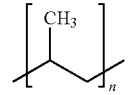

The properties of PP depend on the molecular weight and molecular weight distribution, crystallinity, type and proportion of comonomer (if used) and the isotacticity. PP is typically both tough and flexible and can withstand temperatures greater than 100° C. without melting, and becomes brittle at temperatures below 0° C. PP is typically shaped via injection molding, as well as blow molding and injection-stretch blow molding.

"Incumbent Polypropylene" refers to polypropylene which contains additives commonly included in commercial polypropylene products known in the art. Incumbent polypropylene contains at least about 50 wt. % polypropylene.

Thermoplastic Vulcanizates

Thermoplastic vulcanizates (TPVs) are a subclass of thermoplastic elastomers. As their name implies, thermoplastic elastomers are polymers which consist of materials with both thermoplastic and elastomeric properties. Since they have both rubber and plastic properties, thermoplastic elastomers can be utilized in manufacturing applications such as injection molding.

One source of TPV is commercially known as Santoprene and is available from ExxonMobil. Santoprene may generally be prepared by dynamic vulcanization or cross-linking. A rubber phase is cross-linked while it is being melt-mixed with a thermoplastic material at elevated temperature. TPV's preferably comprise ethylene propylene diene monomer (EPDM) rubber with polypropylene as the preferred thermoplastic material. EPDM rubber suitable for the disclosed invention generally has the chemical formula:

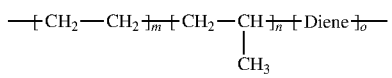

EPDM suitable for the invention is preferably about 60 wt. % to about 70 wt. % ethylene monomer, about 25 wt. % to about 35 wt. % propylene monomer, and about 1 wt. % to about 10 wt. % diene, and more preferably 65 wt. % ethylene, 30 wt. % propylene, and 5 wt. % diene. Preferred dienes include dicyclopentadiene, 5-ethylidene-2-nobornene, and 1,4 hexadiene, and more preferably 5-ethylidene-2-nobornene. TPVs have a density between 0.89-0.98 g/cm$^3$, a Shore hardness of 35A-50D, and a service temperature between −60° C. and 135° C. TPV suitable for the invention preferably has a wt. average molecular weight between about 300 kg/mol and 400 kg/mol, and more preferably 380 kg/mol.

As fully-cured EPDM rubber particles are added to a melt-mix, the polypropylene serves as a matrix material and encapsulates the filler EPDM rubber particles, resulting in a composite material. As such the resulting TPV exhibits the elastomeric properties of the EPDM rubber, as well as the plastic properties of the polypropylene.

Method of Use

The TPV modified PP of the invention may be prepared via any injection molding and/or extrusion molding methods known in the art. In one preferred method, a mixture of TPV and PP pellets are fed into an extrusion molder and are heated above their melting points (approximately 190° C.), such that the TPV and PP are blended and form a PP/TPV mixture. The PP/TPV mixture is then extruded through a die of the extruder and deposited on a pipe or other material. Preferably the PP/TPV mixture is between about 15 wt. % and about 40 wt. % TPV, and more preferably 35 wt. % TPV. Preferably the PP/TPV mixture is between greater than 60% and about 85% incumbent polypropylene.

Working Examples

The following examples illustrate various nonlimiting embodiments of the invention disclosed and claimed herein as well as certain attributes thereof.

Specimen Preparation

Incumbent PP and TPV polymers were dry blended in a plastic bag such that the mixture was 35 wt. % TPV. Air was introduced into the bag to blow it into a ball shape, and the opening of the bag was tightly closed to prevent the release of the air. The bag was then agitated multiple times for 60 seconds in order to achieve a well-dispersed blend of PP and TPV. The mixed blend was then gravity fed by a feeder into a hopper which in turn was connected to the barrel of a Micro-18 twin-screw extruder. The PP/TPV mix was initially fed at ~2.2 lbs/hour, and was subsequently increased to 4 lbs/hour as the torque and pressure in the extruder stabilized.

The PP/TPV pellet mix traveled from the hopper into the feed throat, which dispensed the mix into the horizontal extruder barrel, which contained two spinning screws rotating at 200 rpm. The barrel of the extruder had controlled heat zones, which were pre-heated to 140° C., 160° C., 180°C, 190° C., and 200° C. As such, as the PP/TPV mix passed from the feed section of the extruder to die section it was gradually heated past its melt temperature. The PP/TPV mix melted and was blended together, forming a hot polymer resin. The resin was subsequently pushed through a screen and then through the die of the extruder.

Prior to the extrusion of the PP/TPV mix, a round tube made of low carbon steel having a 2" outer diameter and 0.049" wall thickness was cut into a 4" length. The tube was cleaned using a silica-based medium to remove impurities from the surface of the tube. The tube was then rinsed with acetone and dried using nitrogen. The 4" tube was then concentrically attached to a metal pan having a 6" diameter and a 2" height with a high temperature metal sealant tape. The space between the metal tube and metal pan was filled with the extruded PP/TPV polymer resin. Once the polymer reached the top level of the metal pan, the extrusion was ceased and the polymer was allowed to cool with time. The metal tube/polymer specimen was then removed from the pan, resulting in a specimen comprising a 2" diameter metal tube surrounded by a circular PP/TPV polymer resin having a 6" diameter. A representative specimen 1 having a metal tube 2 and PP/TPV coating 3 is depicted in FIG. 1.

The specimen preparation was repeated to produce multiple specimens. Specimens utilizing 100% incumbent polypropylene were also prepared.

Ring Shear Test—Residual Stress Measurement

Figure 2:
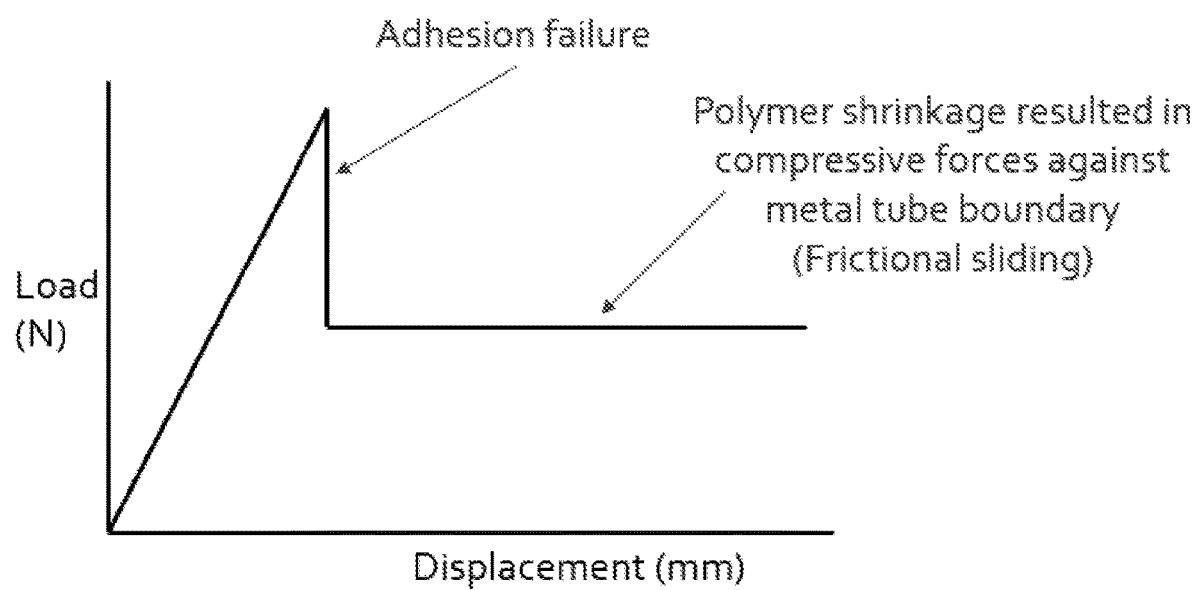
FIG. 2 is a graph depicting displacement as a function of load for PP/TPV specimens subjected to push-out testing.

The PP/TPV and 100% incumbent polypropylene specimens were subjected to push-out testing on an Instron 5581 mechanical test frame. The push-out testing sought to displace the metal tubes from their polymer coatings. Testing was performed at a displacement rate of 0.05"/min. The displacement as a function of load for the PP/TPV specimens is depicted in FIG. 2. As FIG. 2 shows, the metal tube PP/TPV combination exhibited an initial peak load which then plateaued, indicating frictional sliding of the polymer against the metal tube. It was determined that the frictional sliding was due to the compressive force the PP/TPV combination exerted against the metal tube. The 100% incumbent polypropylene specimen exhibited a similarly shaped peak/plateau force-displacement curve.

Average values of the load taken from the plateau portions of the PP/TPV and 100% incumbent polypropylene specimens were obtained. The specimens were weighed and their volume was calculated. While the diameter of each of the specimens was the same (due to the uniform shape of the pan), the height of each of the specimens slightly varied due to variations in extrusion. As such the height for each specimen was measured. Residual stress σ for each specimen was determined via the following formula:

$$\sigma = \frac{P}{\mu A}$$

where P is the push-out (plateau) force measured and A is the surface area of the polymer in contact with the steel tube.

The coefficient of friction u was measured in the ASTM characterization lab and an average value of 0.58 was considered for all specimens.

Figure 3:
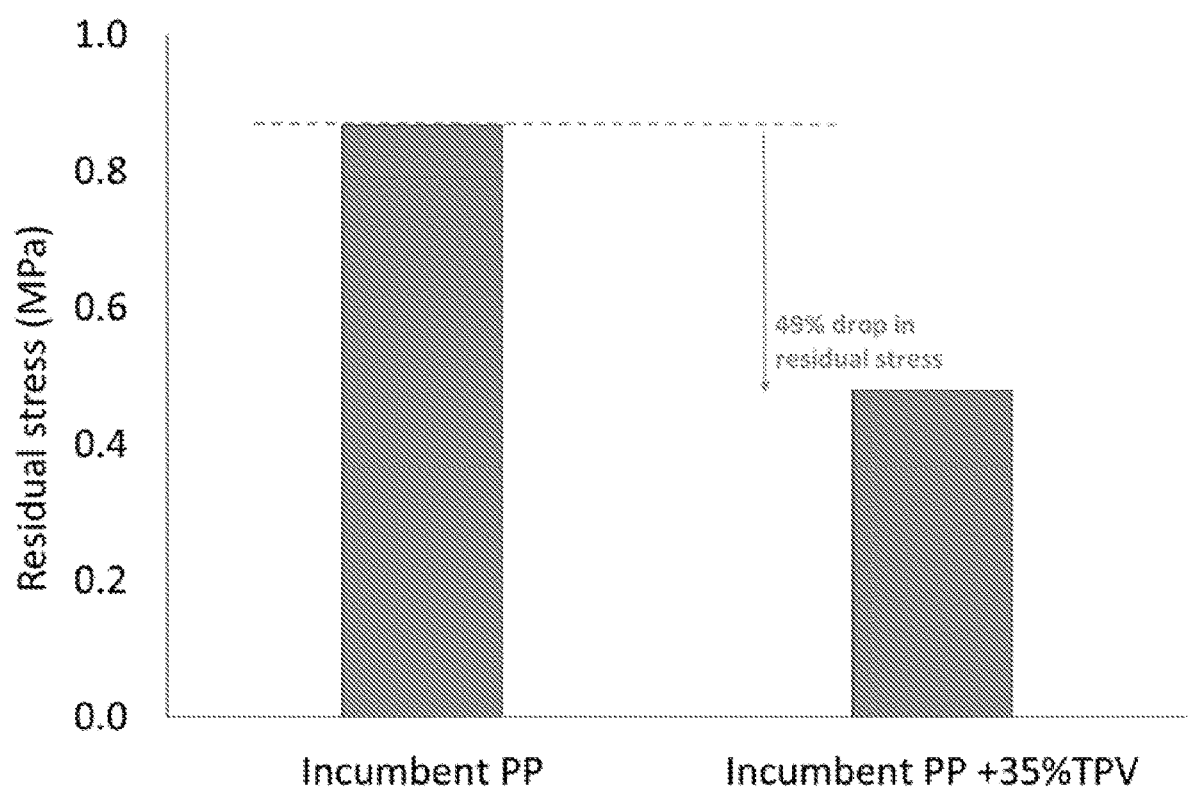
FIG. 3 is a chart comparing the residual stress of incumbent polypropylene versus incumbent polypropylene modified with 35 wt. % TPV.

The residual stress for each of the specimens was calculated and average residual stresses were computed for the PP/TPV, and 100% incumbent polypropylene specimens. These average residual stresses are depicted in FIG. 3. As FIG. 3 shows, the PP/TPV mix exhibited a superior residual stress compared to 100% incumbent polypropylene.

Tri-Axial Compression Test

Figure 4:
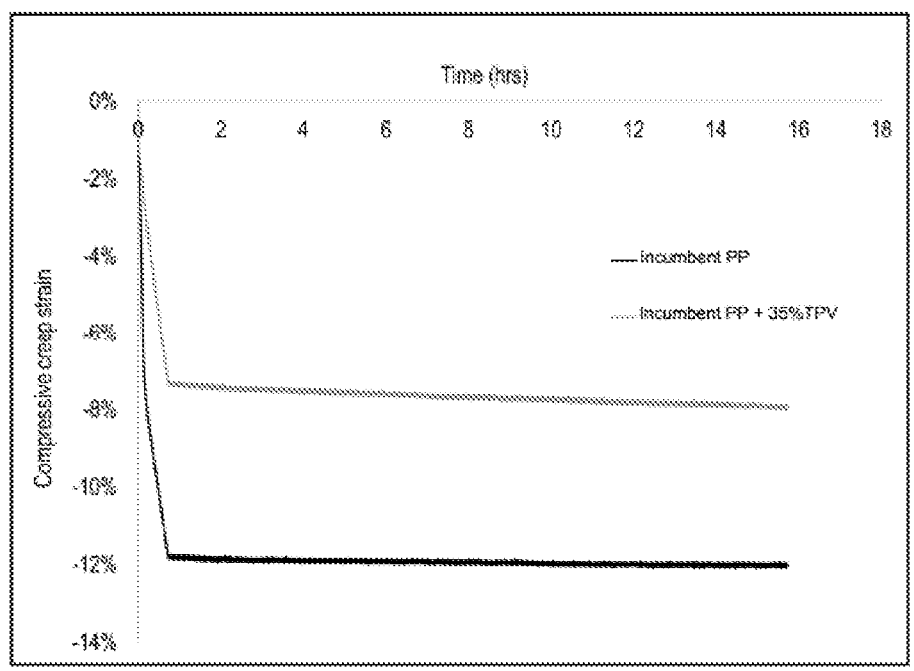
FIG. 4 is a chart comparing the creep strain of incumbent polypropylene versus incumbent polypropylene modified with 35 wt. % TPV.

After the ring shear test was completed, disks of 1" diameter and ¼" thickness were cut out of the ring-shear specimens. The specimens were then placed in a sealable tri-axial compression tester and heated to 150° C. A compressive pressure of 30 MPa was applied and held for 12 hours at 150° C., in conformity with the ISO 12736 standard for subsea coatings under pressure. The compressive creep strain for both PP/TPV and 100% incumbent polypropylene samples were measured over time and are depicted in FIG. 4. As FIG. 4 shows, the PP/TPV exhibited less creep strain compared to the 100% incumbent polypropylene samples.

Although the invention has been described by reference to its preferred embodiment as is disclosed in the specification and drawings above, many more embodiments of the invention are possible without departing from the invention. Thus, the scope of the invention should be limited only by the appended claims.

What is claimed is:

1. A method of insulating a pipe having a first insulating coating and a first end without said first insulating coating, said method comprising the steps of:
   applying a second insulating coating to said first end of said pipe,
   wherein said second insulating coating comprises:
      incumbent polypropylene; and
      one or more thermoplastic vulcanizates at a percent by weight (wt %) ranging from 15 wt % to 40 wt %.

2. The method of claim 1, wherein the pipe is comprised of metal.

3. The method of claim 2, wherein said second insulating coating comprises between 60 wt % to about 85 wt % incumbent polypropylene.

4. The method of claim 2, wherein said second insulating coating comprises about 35 wt % thermoplastic vulcanizates.

5. The method of claim 1, wherein the one or more thermoplastic vulcanizates comprises a polypropylene matrix material and an ethylene propylene diene monomer (EPDM) rubber filler material.

6. The method of claim 5, wherein said EPDM rubber filler material comprises between about 60 wt % to about 70 wt % ethylene monomer, between about 25 wt % to about 35 wt % propylene monomer, and between about 1 wt % to about 10 wt % diene.

7. The method of claim 6, wherein said EPDM rubber filler material comprises about 65 wt % ethylene, about 30 wt % propylene, and about 5 wt % diene.

8. The method of claim 5, wherein said EPDM rubber filler material comprises a diene selected from the group consisting of dicyclopentadiene, 5-ethylidene-2-nobornene, and 1,4 hexadiene.

9. The method of claim 8, wherein said EPDM rubber filler material comprises 5-ethylidene-2-nobornene.

10. The method of claim 1, wherein the one or more thermoplastic vulcanizates has a weight average molecular weight between about 300 kg/mol and about 400 kg/mol.

11. The method of claim 10, wherein the one or more thermoplastic has a weight average molecular weight of about 380 kg/mol.

12. A coating for providing thermal insulation in high pressure environments, the coating comprising incumbent polypropylene and one or more thermoplastic vulcanizates at a percent by weight (wt %) ranging from 15 wt % to 40 wt %, wherein the one or more thermoplastic vulcanizates comprises a polypropylene matrix material and an ethylene propylene diene monomer (EPDM) rubber filler material; wherein said EPDM rubber filler material comprises about 65 wt % ethylene, about 30 wt % propylene, and about 5 wt % diene.

13. The coating of claim 12, wherein said diene comprises 5-ethylidene-2-nobornene.

14. A coating for providing thermal insulation in high pressure environments, the coating comprising incumbent polypropylene and one or more thermoplastic vulcanizates at a percent by weight (wt %) ranging from 15 wt % to 40 wt %, wherein the one or more thermoplastic vulcanizates has a weight average molecular weight between about 300 kg/mol and about 400 kg/mol.

15. A coating for providing thermal insulation to a metal pipe in high pressure environments, said coating comprising incumbent polypropylene and one or more thermoplastic vulcanizates; wherein said coating comprises about 35 wt % of one or more thermoplastic vulcanizates; wherein the one or more thermoplastic vulcanizates has a weight average molecular weight of about 380 kg/mol; wherein the one or more thermoplastic vulcanizates comprises a polypropylene matrix material and an ethylene propylene diene monomer (EPDM) rubber filler material; wherein said EPDM rubber filler material comprises about 65 wt % ethylene, about 30 wt % propylene, and about 5 wt % diene; wherein said diene comprises 5-ethylidene-2-nobornene; and wherein said coating is capable of bonding to a metal pipe.

* * * * *